United States Patent
Yamamoto

(10) Patent No.: US 11,708,039 B2
(45) Date of Patent: Jul. 25, 2023

(54) DRIVER PROFILE RESET SYSTEM AND METHODS THEREOF

(71) Applicant: Honda Motor Co., Ltd., Tokyo (JP)

(72) Inventor: Stuart Masakazu Yamamoto, Greenville, SC (US)

(73) Assignee: Honda Motor Co., Ltd., Tokyo (JP)

( * ) Notice: Subject to any disclaimer, the term of this patent is extended or adjusted under 35 U.S.C. 154(b) by 168 days.

(21) Appl. No.: 17/387,545

(22) Filed: Jul. 28, 2021

(65) Prior Publication Data

US 2023/0036963 A1 Feb. 2, 2023

(51) Int. Cl.
| | | |
|---|---|---|
| *B60R 16/037* | (2006.01) | |
| *B60W 50/00* | (2006.01) | |
| *G06F 21/31* | (2013.01) | |
| *B60N 2/00* | (2006.01) | |

(52) U.S. Cl.
CPC ............ *B60R 16/037* (2013.01); *B60N 2/002* (2013.01); *B60W 50/0098* (2013.01); *G06F 21/31* (2013.01); *B60W 2050/0083* (2013.01)

(58) Field of Classification Search
None
See application file for complete search history.

(56) References Cited

U.S. PATENT DOCUMENTS

| | | | |
|---|---|---|---|
| 9,238,450 B1 * | 1/2016 | Kleve | ............... B60R 16/037 |
| 9,308,879 B2 | 4/2016 | Wright et al. | |
| 9,604,541 B1 * | 3/2017 | Anter | ............... B60R 16/037 |
| 10,857,996 B2 | 12/2020 | Kim et al. | |
| 2020/0247337 A1 | 8/2020 | Brown et al. | |
| 2021/0046888 A1 | 2/2021 | Vardharajan | |
| 2021/0094492 A1 * | 4/2021 | Zender | ............... G06F 21/629 |
| 2021/0101546 A1 | 4/2021 | Diamond et al. | |

FOREIGN PATENT DOCUMENTS

DE 102012204386 A1 9/2013

* cited by examiner

*Primary Examiner* — Todd Melton
(74) *Attorney, Agent, or Firm* — Aaron Fong; American Honda Motor Co., Inc.

(57) ABSTRACT

The present disclosure relates to user settings on a vehicle. More particularly, this disclosure describes a driver profile reset system and methods thereof to remove those user settings. In an illustrative embodiment, a driver may be presented with a pin pad on a head unit display. The user may enter their pin thereon. The system may authenticate it to enable user settings on the vehicle. Thereafter, the user settings may be removed or wiped from the system to prevent access to such information. The setting, for example, may be removed after the driver unbuckles their seatbelt and opens their door.

20 Claims, 8 Drawing Sheets

DRIVER PROFILE RESET SYSTEM AND METHODS THEREOF

BACKGROUND

Many vehicles may come equipped with key fobs. These key fobs may perform locking or unlocking of the vehicle via a built-in radio frequency identification (RFID) system. The RFID may be used to identify stored information that may automatically enable particular settings for a user. In suitably equipped cars, seats and mirrors may be adjusted using electric controls. These driver led adjustments may be stored in memory for later recall. Most systems may allow users to store more than one set of adjustments. This may allow multiple drivers to store their comfort settings, or a single driver to store several different occupant positions. Other settings that may be saved and stored include, but are not limited to, an audio source, radio stations, climate control options, user interface mappings, and driving modes.

Privacy remains a concern for such user settings. For instance, and when another party such as a valet obtains the user's vehicle, they may be privy to the user's stored information. The user's information and settings may be wiped clean when they turn off the vehicle. Nevertheless, and often times, the vehicle is not turned off and thus, allows access to the user's settings and information. The present disclosure provides for a driver profile reset system and methods thereof that addresses the above identified concerns. Other benefits and advantages will become clear from the disclosure provided herein and those advantages provided are for illustration. The statements in this section merely provide the background related to the present disclosure and does not constitute prior art.

BRIEF DESCRIPTION

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, a vehicle is provided. The vehicle may include a driver seatbelt sensor, a driver door sensor, at least one processor, and a memory operatively coupled to the processor, the memory storing program instructions that when executed by the processor, causes the processor to perform processes. The processes may include determining whether a seatbelt has been unfastened by the driver seatbelt sensor, determining whether a door has been opened by the driver door sensor and removing user settings on the vehicle when both the seatbelt has been unfastened and the door has been opened.

In accordance with another aspect of the present disclosure, a vehicle is provided. The vehicle may include a driver seatbelt sensor, a driver door sensor, and a control system. The control system may determine whether a seatbelt has been unfastened by the driver seatbelt sensor and determine whether a door has been opened by the driver door sensor. The control system may remove user settings on the vehicle when both the seatbelt has been unfastened and the door has been opened.

In accordance with yet another aspect of present disclosure, a method for removing user settings within a vehicle is provided. The method may include receiving a pin. After authenticating the pin, the method may establish the user settings within the vehicle. In addition, the method may include determining whether a driver seatbelt has been unfastened and determining whether a driver door has been opened. The method may also include removing the user settings on the vehicle when both the driver seatbelt has been unfastened and the driver door has been opened.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

The present disclosure relates to user settings on a vehicle. More particularly, this disclosure describes a driver profile reset system and methods thereof to remove those user settings. In an illustrative embodiment, a driver may be presented with a pin pad on a head unit display. The user may enter their pin thereon. The system may authenticate the pin to enable user settings on the vehicle. Thereafter, the user settings may be removed or wiped from the system to prevent access to such information. The setting, for example, may be removed after the driver unbuckles their seatbelt and opens their door.

Numerous other modifications or configurations to the driver profile reset system and methods thereof will become apparent from the description provided below. For example, while the unlocking of the seatbelt and door opening triggered removal of the user settings, other actions or sequences may be used such as putting the car in park, pressing on the brake, or removing hands from the steering wheel. Advantageously, privacy may be maintained whenever the vehicle is driven by another party that did not provide the pin to enable the user settings. The automated function of removing the user settings may provide a driver with a peace of mind such that they may easily drop off their vehicle to a valet worry free. Other advantages will become apparent from the description provided below.

Figure 1:
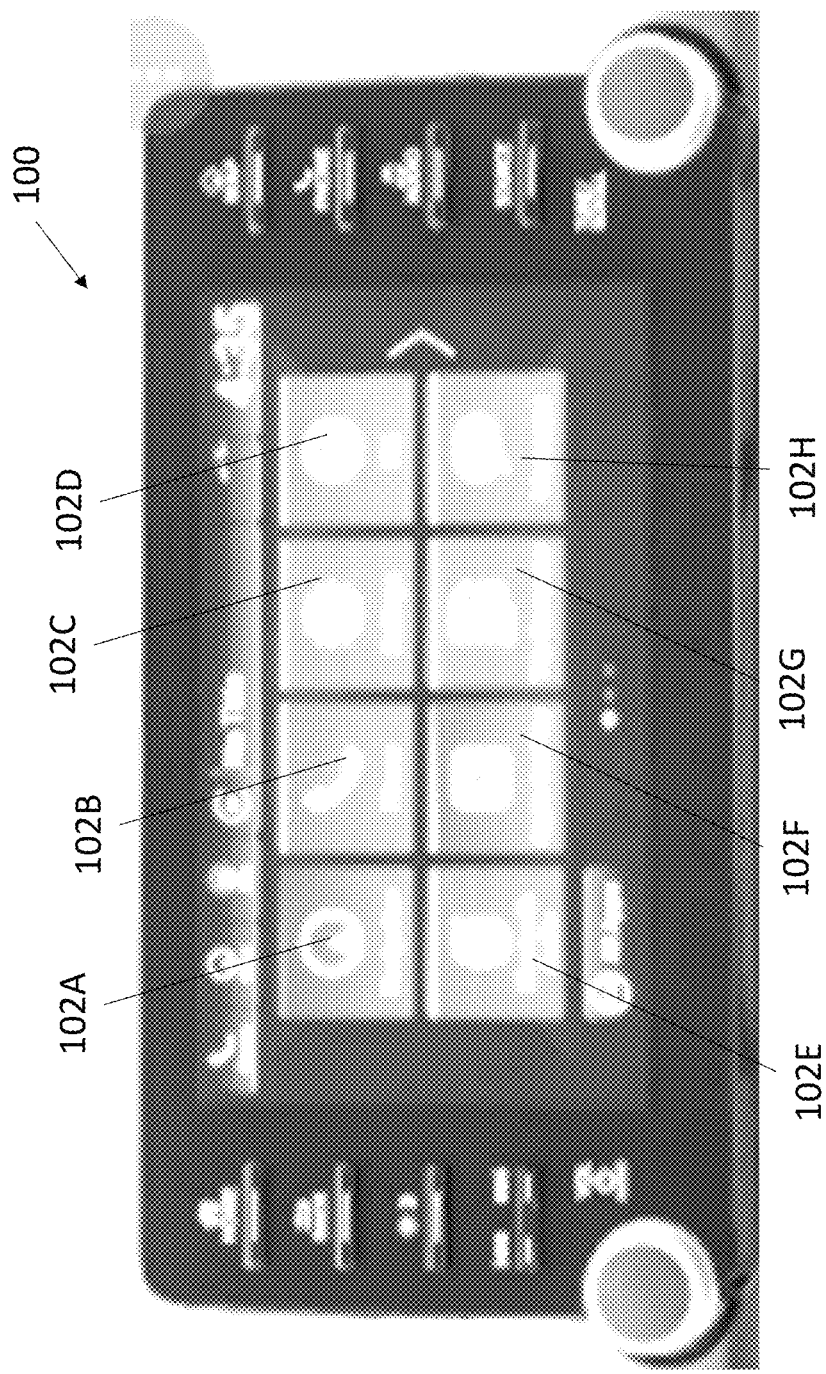
FIG. 1 is a schematic diagram of an illustrative head unit for displaying options for a user based on initial default settings in accordance with one aspect of the present disclosure.

Turning now to FIG. 1, a schematic diagram of an illustrative head unit 100 for displaying options 102A, 102B, 102C, 102D, 102E, 102F, 102G and 102H (collectively 102) for a user based on an initial default settings in accordance with one aspect of the present disclosure is provided. These options 102 may include a navigation option 102A, phone option 102B, settings option 102C, web option 102D, Bluetooth® audio option 102E, Carplay® option 102F, trip summary option 102G, and a messaging option 102H. These options 102 may be provided on the head unit 100 as default settings and not as part of any customized user settings which are associated when a user enters in their pin.

Figure 2:
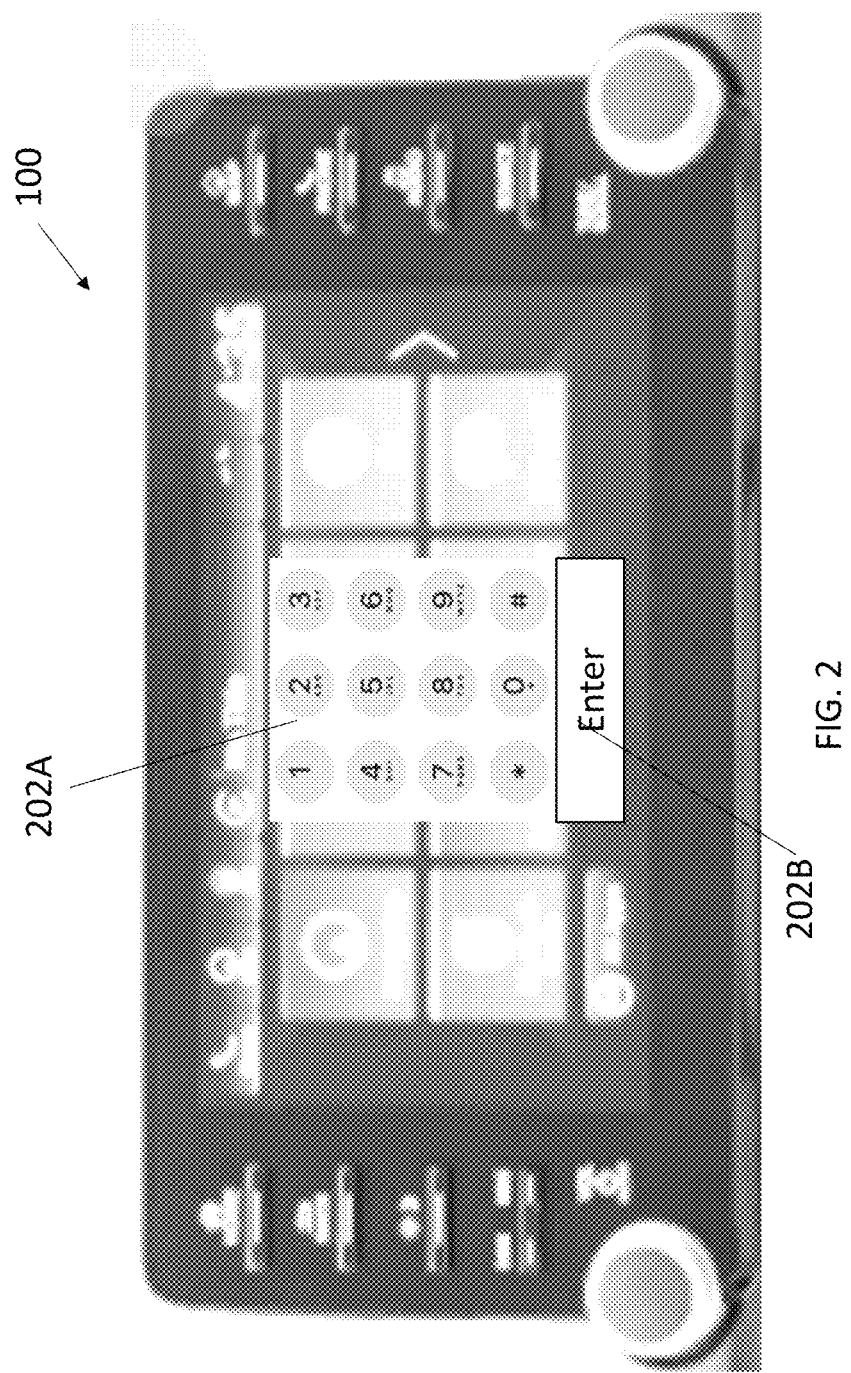
FIG. 2 is a schematic diagram of the illustrative head unit for displaying a pin pad for the user to obtain their personalized settings in accordance with one aspect of the present disclosure.

FIG. 2 shows a schematic diagram of the illustrative head unit 100 for displaying a pin pad 200A for the user to obtain their personalized settings in accordance with one aspect of the present disclosure. The pin pad 202A may for example include numeric keys or alphanumeric keys. The pin pad 200A may be used to enter in a specific driver identification or information to pull up their settings. An enter button 202B may be provided to authenticate the pin after the pin is entered in. In one alternative example, the pin may be accepted after being entered in without the use of the enter button 202B.

After receiving the pin, it may be authenticated by a computer system of the vehicle. The authentication may occur remotely or onboard the vehicle. Once authenticated, the user's personalized settings may be retrieved. In an example, the personalized settings may include those that are related to the head unit or other display, or vehicle settings such as audio settings or window and mirror settings. Other settings that may be loaded into the vehicle after the pin has been authenticated may include contacts, messaging, or payment systems such as digital wallets.

Figure 3:
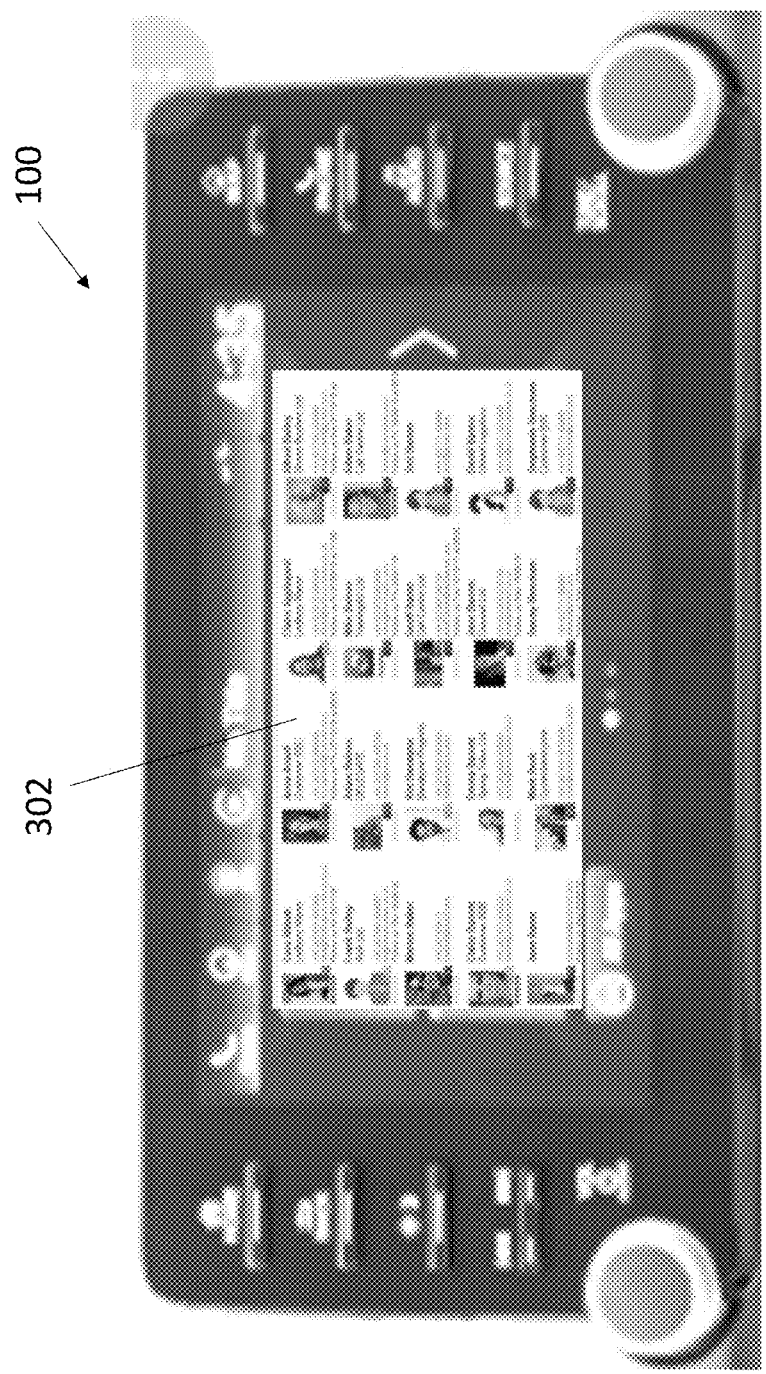
FIG. 3 is a schematic diagram of the illustrative head unit showing personalized settings in accordance with one aspect of the present disclosure.

FIG. 3 is a schematic diagram of the illustrative head unit 100 showing personalized settings in accordance with one aspect of the present disclosure. The head unit 100 may display the personalized settings 302 that are specific to that particular user who entered the pin. In the illustrated example, these settings 302 may include a contact list that lists information of a driver's contacts such as telephone numbers, addresses, or photographs. Other types of user settings that may be shown may include calendar entries or meeting schedules.

While the previous settings were shown on the head unit 100, other types of settings may be provided. For example, settings related to cabin temperatures may not be seen on the head unit but may be enabled after the pin has been entered in. If applicable, window tinting may also be enabled as a user setting. The tint on the windows may be darkened or lightened based on the user settings.

In another example, audio streaming services may be established for a particular user if their personalized settings are enabled. Pandora® or Spotify® may be setup after the pin has been authenticated. Typically, the pin enables other settings which may be private and kept secret from those not having access to the pin.

Figure 4:
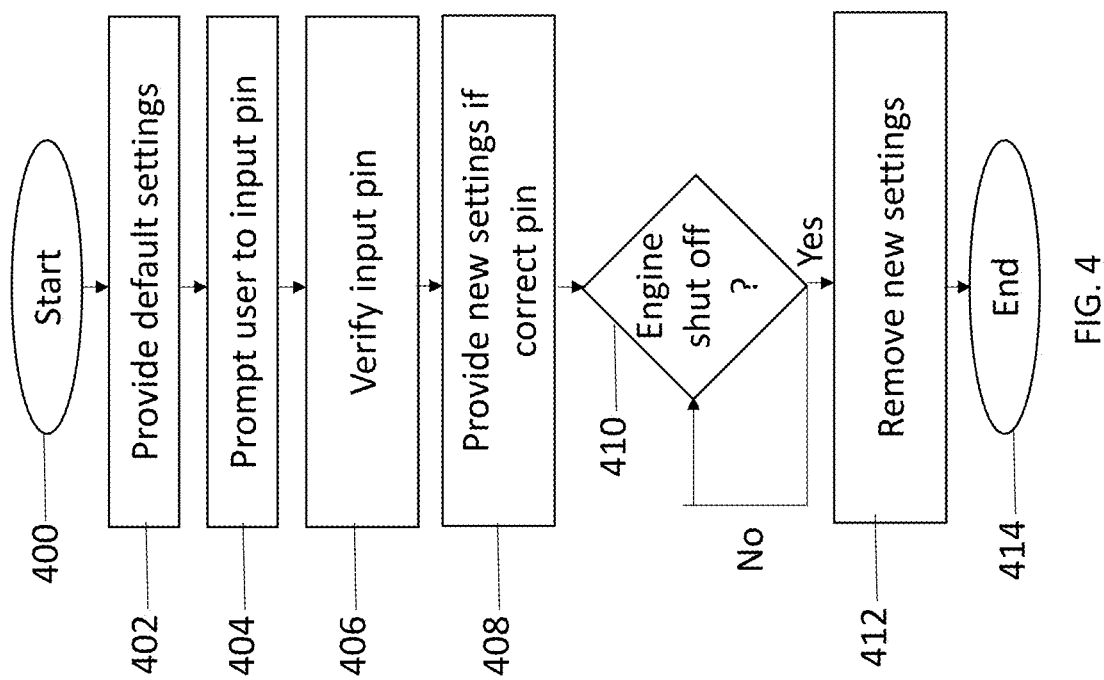
FIG. 4 is a flow chart showing exemplary processes for removing the user settings in accordance with one aspect of the present disclosure.

With reference to FIG. 4, a flow chart showing exemplary processes for removing the user settings in accordance with one aspect of the present disclosure is provided. To determine whether to remove the user preferences, this embodiment determines whether the engine has been shutoff. Fewer or more processes may be used and those described processes should not be limiting to the present disclosure. The processes may begin at block 400.

At block 402, default settings may be provided on the head unit. These settings may include the options above, which are not specific to any particular user. A user may be prompted on the head unit for a pin at block 404. A pin pad may be shown. The pin may incorporate numeric or alphanumeric characters. Other methods of entering in a pin or authentication information may be used. For example, biometrics may be used to log in the particular user.

At block 406, the pin may be verified by the vehicle. This may be done remotely or locally. For example, the pin may be provided to a remote server where it is verified and this verification may be relayed back to the vehicle. In another example, the authorization may be performed on the vehicle itself. The computer system on the vehicle would access a local database to verify the pin.

At block 408, new settings may be shown associated with the user settings. These settings may include those items shown on the head unit or may incorporate other settings outside the head unit. For example, window and seat settings may be adjusted based on a verified pin. A user interface may also be part of the new settings associated with the pin. The settings may be retrieved locally from an internal database or remotely on a server.

At decision block 410, a determination may be made on whether the engine of the vehicle has been shut off. When the engine is not shut off, the system may continually check whether this condition has been met. If the engine has been shut off, at block 412, the new settings may be removed. In one embodiment, the settings may be removed by erasing them from the vehicle storage system. Alternatively, the settings may be continually stored on the vehicle until a correct pin is reentered. The processes may end at block 414.

Figure 5:
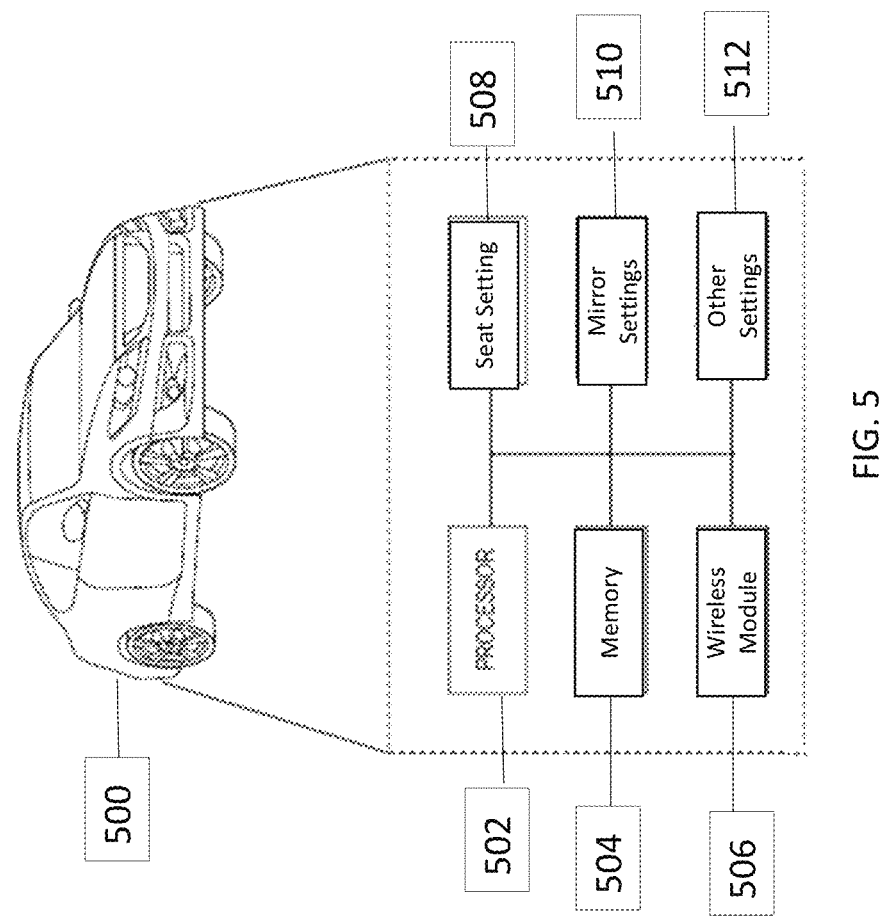
FIG. 5 is a schematic diagram of illustrative components within a vehicle in accordance with one aspect of the present disclosure.

FIG. 5 is a schematic diagram of illustrative components within a vehicle 500 in accordance with one aspect of the present disclosure. Through these components, the seat settings 508, mirror settings 510, and/or other settings 512 may be adjusted. A computer system may perform the processes described herein. The computer system may reside within the vehicle 500. Alternatively, processing may occur through a connected device such as a smartphone. Still yet, the computer system may perform the processes remotely outside of the vehicle 500. The components of the computer system, as well as the components of other systems, hardware architectures and software architectures discussed herein, may be combined, omitted or organized into different architectures for various implementations. However, the example embodiments of the disclosure discussed herein focus on the vehicle environment, with corresponding system components and related methods.

As shown, the computer system within the vehicle 500 may include internal processing memory 504, an interface circuit, and bus lines for transferring data, sending commands, and communicating with the vehicle systems. Generally, the system may include a processor 502 and memory 504. The vehicle 500 may also include a bus for sending data internally between the various components of the computer system.

The memory 504 may generally include both volatile memory such as RAM and non-volatile memory such as ROM, flash memory or the like. The non-volatile portion of the memory 504 may be used to store persistent information which should not be lost when the vehicle 500 is powered down. To implement logic residing on the memory 504, the computer system may include at least one processor 502. The processor 502 may implement instructions within the memory 504 for executing processes. For example, these processes may include detecting a user device headed towards the vehicle 500 and giving them access to the vehicle 500. The processes may include adjusting setting within the vehicle 500. The memory 504, as well as the processor 502, may be local to the computer system on the vehicle 500, or remote therefrom.

The vehicle 500 may include a vehicle GPS system to provide GPS data. Furthermore, the computer system may include an output device. The output device may be used for providing a display on a graphical user interface (GUI) or other output method such as audio or haptics.

The vehicle 500 may include a wireless module 506. Through this wireless module 506, information may be obtained about an incoming or approaching device. This may occur through a remote server wherein the device communicates its location and works with the remote server. In another example, the device may communicate directly with the wireless module 506 of the vehicle 500 through near field communications. A combination of remote and local processes may be used for identifying the device with the vehicle 500 and the wireless module 506.

As described above, a display may be shown on the output device of the vehicle 500. The processor 502 may provide a pin pad after the user has entered into the vehicle 500. The pin pad may come in a numerical form or alphanumerical form. After receiving a pin, it may be validated by the computer system within or outside the vehicle 500. Through this, the user may be validated by the computer system of the vehicle 500 to integrate their specific settings into the vehicle 500.

The seat setting 508, for example, may be changed based on the identity of the user. This may modify the height, back angle, heating, cooling, closeness to the steering wheel, the headrest position, etc. These settings 508 may be adjusted all at once, in a particular order, or one at a time. The seat settings may be performed while the user is on the seat.

Mirror settings 510 may also be adjusted. These may include the side mirrors on the vehicle 500. Back mirrors may also be part of the mirror settings 510. Furthermore, the settings may include backup camera settings or other types of settings that may be used by the driver for visual periphery around the vehicle 500.

Other settings 512 that may be adjusted within the vehicle 500 may include audio or sound settings. The vehicle 500 may be able to play sound from a podcast that they are a member of, while if they were not signed into the vehicle computer system, they would not be allowed to stream data from their podcast. Special services such as Pandora® which the user may have an account may be accessed if properly signed into. Other settings 512 may include driving preferences. For example, the user may like a sportier mode of driving. The vehicle 500 may be limited when the pin is not placed in or authorized to a normal mode.

Other settings 512 may include wind shield wiper speeds. Speeds may be adjusted depending on the specific user. Some users may prefer to have the wiper speed slower when raid is coming down, while others may desire faster speeds. Other settings 512 may include user interface settings. The look and feel of the user interface may be changed based on the user's settings as defined by the entered pin. In another example, contacts, telephone numbers, addresses may be kept hidden if a pin is not properly placed in. Other types of data may also be hidden such as messages, applications, vehicle settings, etc.

The settings may be learned over time and associated with a specific user. Slight adjustments may be made each time the user logs into their profile and adjusts their settings. In one example, a learned setting may automatically adjust a seat based on a user's physical characteristics. If the user places their backrest in a downwards position, the bottom of the seat may rise. The physical characteristics may then be kept. The seat settings 508 may also be learned from other vehicles which the user has been configured for. For example, different seat settings for the same user may be made depending on whether the user is in a sedan or sports utility vehicle.

In one embodiment, the new settings after the pin has been entered in may be determined based on the last settings that the user implemented. The settings may also be preprogrammed. Preprogrammed settings may be downloaded from remote locations such that they be sent to the vehicle 500 when a correct pin is placed in.

Figure 6:
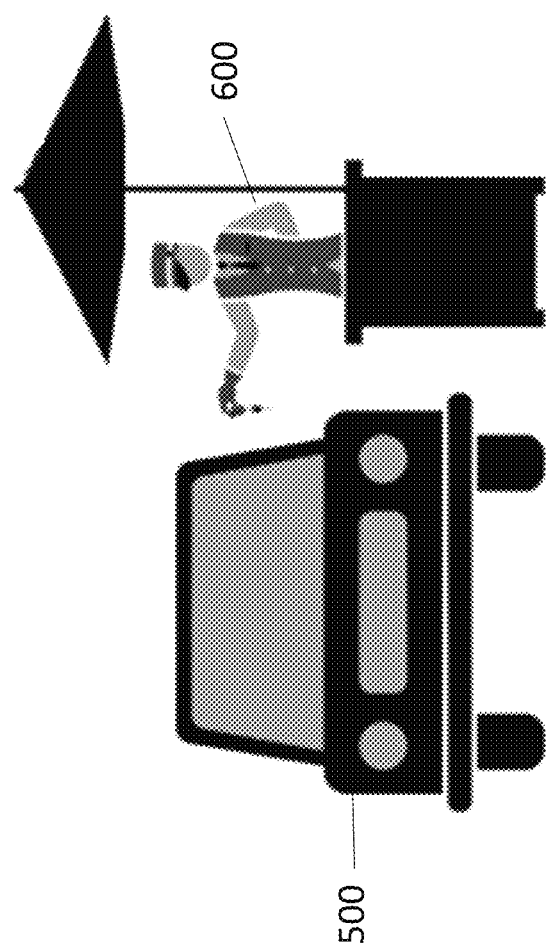
FIG. 6 is a schematic diagram of an illustrative valet service in accordance with one aspect of the present disclosure.

The previous system used the engine turn off as a cue to remove implemented user settings. Other methods to remove these settings may include a sequence of events. FIG. 6 is a schematic diagram of an illustrative valet service 600 in accordance with one aspect of the present disclosure. In this scenario, the valet service 600 may take the user's car without ever shutting the vehicle 500 off. As such, the user settings would not be removed or closed. The following processes remove the user settings when the user produces a sequence regardless of whether the user shuts the vehicle off.

Figure 7:
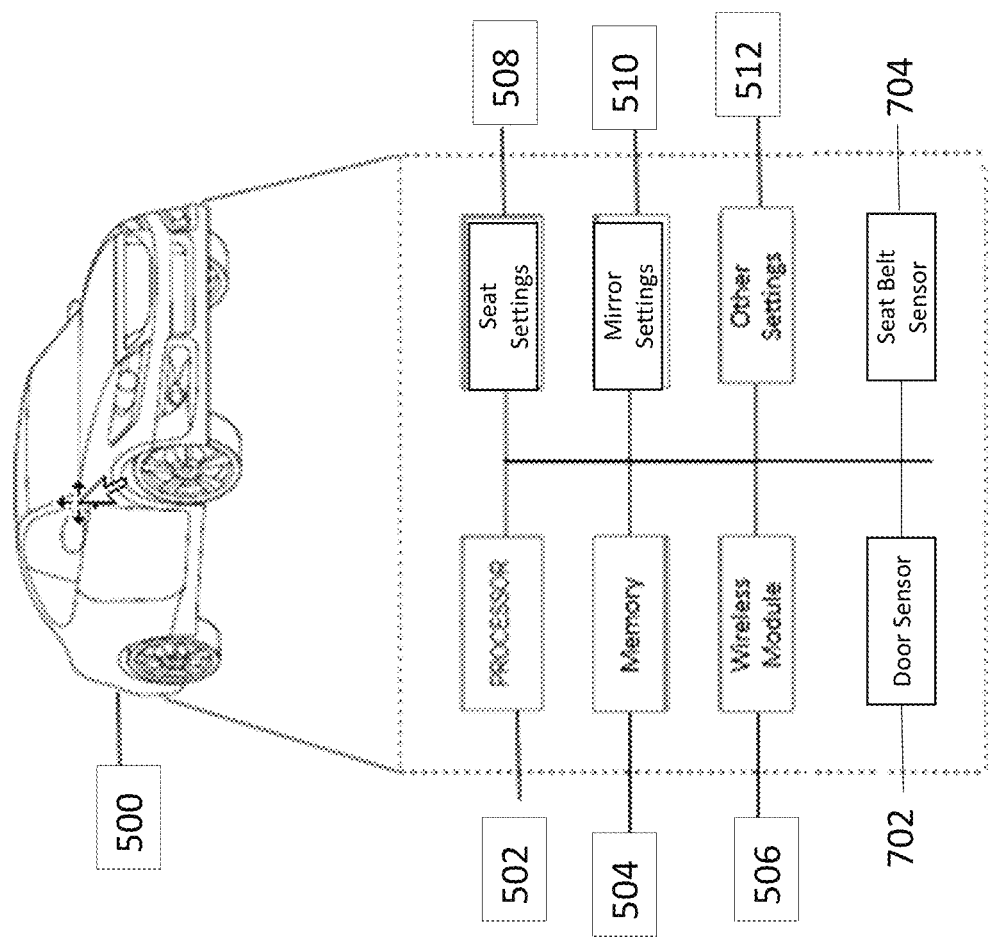
FIG. 7 is another schematic diagram of illustrative components within the vehicle in accordance with one aspect of the present disclosure.

FIG. 7 is another schematic diagram of illustrative components within the vehicle 500 in accordance with one aspect of the present disclosure. Similar to before, the vehicle computer system may include a processor 502, memory 504, wireless module 506, seat settings 508, mirror settings 510, and other settings 512. Instead of the settings getting removed when the vehicle 500 is shut down however, alternative processes may be used. Advantageously, this may remove any instances where a valet takes the keys and the vehicle is not shut off.

In one example of an alternative method to remove specific vehicle settings, the sequence may include a door sensor 702 and a seatbelt sensor 704 to remove the settings. In one embodiment, the door sensor 702 may include a spring loaded switch located in a door frame of the vehicle. The spring loaded switch may open a circuit when door is open. The door sensor 702 may be located on the driver's door.

The seatbelt sensor 704 may also be used in the process for removing the settings from the vehicle, In one embodiment, the driver seatbelt sensor 704 may be located in a clasp associated with the driver's seat. The clasp may be the in the seat itself or be tethered to some other location on the vehicle such as a B pillar. The clasp may contain a switch such that when the clasp receives the tongue of a seatbelt, the circuit is closed indicating that the seatbelt is indeed inserted. When an action of the seatbelt being inserted and then not being inserted occurs, this may indicate that the user has unfastened their seatbelt.

In one embodiment, the driver seatbelt sensor 704 may be located in a tongue of the seatbelt associated with the driver's seat. The sensor 704 may be on the portion that goes into the clasp. This sensor 704 may use wireless communications or a wireline that may run the length of the seatbelt.

In a typical sequence, the sequence may remove the user settings from the vehicle when both the seatbelt has been unfastened and the door has been opened. By performing this, and not in any specific order, settings such as seat or mirror settings may be removed. Audio settings may also be removed. No specific sequence is typically used, as long as the door is opened and the seatbelt is unbuckled. If both are true, the user settings may be removed from the vehicle, or hidden from view.

Figure 8:
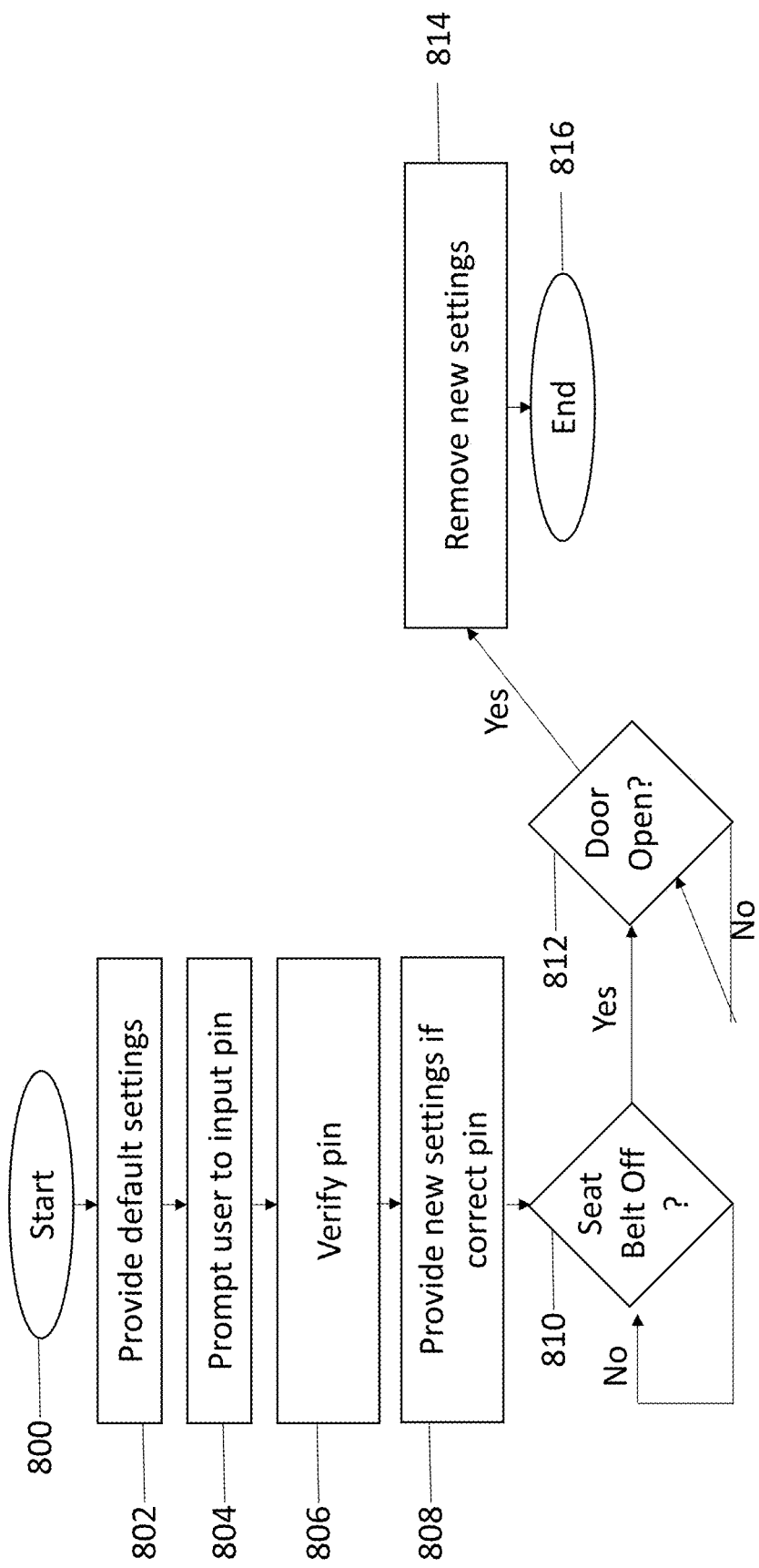
FIG. 8 is a flow chart showing exemplary processes for removing the user settings in accordance with one aspect of the present disclosure.

FIG. 8 is a flow chart showing exemplary processes for removing the user settings in accordance with one aspect of the present disclosure. Fewer or more processes may be used and those described processes should not be limiting to the present disclosure. The processes may begin at block 800.

At block 802, the default settings may be shown on the head unit. These settings may include those that do not need a pin to access information. The default settings may be, for example, a navigation option, phone option, settings option, web option, Bluetooth® audio option, Carplay® option, trip summary option, and a messaging option.

A prompt may be provided to the user (typically the driver) for a pin at block 804. This pin may be numeric or alphanumeric. A keyboard or pin pad may be displayed for the pin to be entered. In one embodiment, the pin pad would be shown after selecting an option within the GUI. Alternatively, the pin pad may be shown when the user enters the vehicle and the engine is turned on.

At block 806, the computer system may verify the input code from the pin pad. This may be authenticated on the vehicle or remotely. For example, and in the remote case, the authentication may take place on a communication between a server and a transmission control unit (TCU) on the vehicle. The authentication may take place through a connected phone or device on the vehicle where that device may communicate with a remote server. Other types of authentication processes may be used.

At block 808, and after the pin is authorized, new settings are provided. These new settings may include a number of items that may be shown on the head unit or may be settings within the vehicle itself, for example, windows or seat settings. The seat may be adjusted based on a correct pin being entered in or the audio settings may be set within the vehicle.

At decision block 810, a determination may be made on whether the seatbelt is off or unbuckled. The computer system may monitor the driver's seatbelt only to implement this function. If the seatbelt is not off, then the processes return to decision block 810. However, if the seatbelt has been taken off, at decision block 812, a determination is made whether the driver door is open. If not, the computer system returns to decision block 812. If the driver's door is open, then the processes proceed to block 814 where the new settings are removed. The processes end at block 816.

The sequence of the seatbelt unbuckled and the door opening may be interchanged and do not necessarily have to occur in that order. When both are true, then the new settings are removed. This may indicate that the driver has stepped out of their vehicle and has intended to get out, and possibly provide their vehicle to a valet service.

In another example of where this may be used is when a valet service is driving a rental vehicle and wishes to provide the vehicle to an intended recipient. The valet who is driving the car may not want their information to be shown to the rental car customer. When the car is turned over to the renter, the valet would not want his personal information being shown on the rental vehicle. When the valet unbuckles their seatbelt and opens the driver's door, the information on the rental vehicle is wiped out or removed and the renter would not have access to it.

In another scenario, when spouses change seats, they may wish to remove the user settings automatically from the other spouse. By exiting the vehicle while still running, the user settings may be removed automatically. The spouse entering into the vehicle may then provide their pin to execute their individual settings.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A vehicle comprising:
    a driver seatbelt sensor;
    a driver door sensor;
    at least one processor; and
    a memory operatively coupled to the processor, the memory storing program instructions that when executed by the processor, causes the processor to:
    load user settings on the vehicle;
    determine whether a seatbelt has been unfastened by the driver seatbelt sensor;
    determine whether a door has been opened by the driver door sensor;
    remove the user settings on the vehicle when both the seatbelt has been unfastened and the door has been opened.

2. The vehicle of claim 1, wherein the memory storing program instructions, that when executed by the processor, causes the processor to provide a default user setting.

3. The vehicle of claim 2, wherein the memory storing program instructions, that when executed by the processor, causes the processor to display a pin pad.

4. The vehicle of claim 3, wherein the memory storing program instructions, that when executed by the processor, causes the processor to receive a specific code which enables the user settings on the vehicle.

5. The vehicle of claim 1, wherein the driver seatbelt sensor is located in a clasp associated with the driver's seat.

6. The vehicle of claim 1, wherein the driver seatbelt sensor is located in a tongue of the seatbelt associated with the driver's seat.

7. The vehicle of claim 1, wherein the driver door sensor is a spring loaded switch located in a door frame of the vehicle.

8. The vehicle of claim 7, wherein the spring loaded switch opens a circuit when door is open.

9. The vehicle of claim 1, wherein removing the user settings on the vehicle when both the seatbelt has been unfastened and the door has been opened comprises removing access to personal information on a display.

10. The vehicle of claim 1, wherein removing the user settings on the vehicle when both the seatbelt has been unfastened and the door has been opened comprises removing seat or mirror settings.

11. The vehicle of claim 1, wherein removing the user settings on the vehicle when both the seatbelt has been unfastened and the door has been opened comprises removing audio settings.

12. A vehicle comprising:
a database for storing user settings;
a driver seatbelt sensor;
a driver door sensor; and
a control system loading user settings on the database, determining whether a seatbelt has been unfastened by the driver seatbelt sensor and determining whether a door has been opened by the driver door sensor, the control system removing the user settings on the database when both the seatbelt has been unfastened and the door has been opened.

13. The vehicle of claim 12, wherein the control system provides a pin pad on a display for entering a code to enable the user settings.

14. The vehicle of claim 13, wherein the control system verifies authenticates the code to enable the user settings.

15. The vehicle of claim 12, wherein the control system communicates with a non-vehicle device to obtain the user settings.

16. The vehicle of claim 15, wherein the non-vehicle device is a personal device or server.

17. The vehicle of claim 12, wherein the user settings is personal information for display or window and seat settings.

18. A method for removing user settings within a vehicle comprising:
receiving a pin;
after authenticating the pin, establish the user settings within the vehicle;
determining whether a driver seatbelt has been unfastened;
determining whether a driver door has been opened; and
removing the user settings on the vehicle when both the driver seatbelt has been unfastened and the driver door has been opened.

19. The method for removing vehicle settings of claim 18, wherein removing the user settings on the vehicle includes wiping personal information for display from the vehicle.

20. The method for removing vehicle settings of claim 18, wherein removing the user settings on the vehicle includes removing audio information from the vehicle.

* * * * *